US009704427B2

(12) United States Patent
Huang et al.

(10) Patent No.: US 9,704,427 B2
(45) Date of Patent: Jul. 11, 2017

(54) METHOD AND DEVICE FOR ADJUSTING GRAYSCALE BRIGHTNESS AND 3D DISPLAY DEVICE

(71) Applicant: Hisense Electric Co., Ltd., Qingdao (CN)

(72) Inventors: Shunming Huang, Qingdao (CN); Yuxin Zhang, Qingdao (CN); Jia Yang, Qingdao (CN); Jie Yang, Qingdao (CN)

(73) Assignees: HISENSE ELECTRIC CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 130 days.

(21) Appl. No.: 14/723,633

(22) Filed: May 28, 2015

(65) Prior Publication Data
US 2016/0173862 A1    Jun. 16, 2016

(30) Foreign Application Priority Data
Dec. 10, 2014 (CN) .......................... 2014 1 0757576

(51) Int. Cl.
*G09G 3/34* (2006.01)
*G09G 3/20* (2006.01)
*G09G 3/00* (2006.01)
*H04N 13/04* (2006.01)

(52) U.S. Cl.
CPC ........... *G09G 3/2003* (2013.01); *G09G 3/003* (2013.01); *G09G 3/2007* (2013.01); *G09G 3/342* (2013.01); *G09G 3/3406* (2013.01); *G09G 2320/0252* (2013.01); *G09G 2320/0646* (2013.01); *G09G 2360/144* (2013.01); *H04N 13/0497* (2013.01)

(58) Field of Classification Search
CPC ...................................... G09G 3/3406–3/3426
USPC ......................................................... 345/102
See application file for complete search history.

(56) References Cited

U.S. PATENT DOCUMENTS

| 7,733,358 B2* | 6/2010 | Hsu ....................... G09G 3/3406 345/102 |
| 2010/0134392 A1* | 6/2010 | Sumi .................... G09G 3/3648 345/87 |
| 2012/0092386 A1* | 4/2012 | Wu ....................... G09G 3/3406 345/690 |
| 2013/0010014 A1* | 1/2013 | Hasegawa ............ G09G 3/3607 345/690 |
| 2016/0104444 A1* | 4/2016 | Miyata ................. G09G 3/3406 345/205 |

* cited by examiner

*Primary Examiner* — Chad Dicke
(74) *Attorney, Agent, or Firm* — Harness, Dickey & Pierce, P.L.C.

(57) ABSTRACT

The disclosure discloses a method and device for adjusting grayscale brightness and a 3D display device. In the present disclosure, an initial gray level and a target gray level are determined, and it is determined whether the target gray level is too low or too high, so that it is determined whether over-voltage driving can be applicable, and in the case that it is not appropriate to adjust grayscale brightness through over-voltage driving, a backlight brightness adjustment table is searched, and backlight brightness is adjusted up or down using a found adjustment parameter to thereby adjust the grayscale brightness so as to reduce crosstalk in liquid crystal display.

13 Claims, 4 Drawing Sheets

METHOD AND DEVICE FOR ADJUSTING GRAYSCALE BRIGHTNESS AND 3D DISPLAY DEVICE

CROSS-REFERENCE TO RELATED APPLICATION

This application claims the benefit and priority of Chinese Patent Application No. 201410757576.2 filed Dec. 10, 2014. The entire disclosure of the above application is incorporated herein by reference.

FIELD

The present disclosure relates to the field of display technologies and particularly to a method and device for adjusting grayscale brightness and a 3D display device.

BACKGROUND

This section provides background information related to the present disclosure which is not necessarily prior art.

At present the 3D display technology has become one of vital display application technologies in the field of flat panel display technologies. Currently common 3D display technology includes a polarized 3D technology and an active shutter 3D technology. Here the active shutter 3D technology has become a predominant technology because its prominent 3D effect.

An active shutter 3D system is a technique of displaying stereoscopic 3D images. It works by only presenting the image intended for the left eye while blocking the right eye's view, then presenting the right-eye image while blocking the left eye, and repeating this so rapidly that the interruptions do not interfere with the perceived fusion of the two images into a single 3D image. The active shutter 3D systems generally use liquid crystal shutter glasses. The glasses are controlled by a timing signal that allows the glasses to alternately block one eye, and then the other, in synchronization with the refresh rate of the screen. The rate of alternation required to completely eliminate noticeable flicker is typically well over 30 image pair cycles per second, the maximum possible with a 60 Hz display. A 120 Hz display, allowing 60 images per second per eye, is widely accepted as flicker-free.

Figure 1:
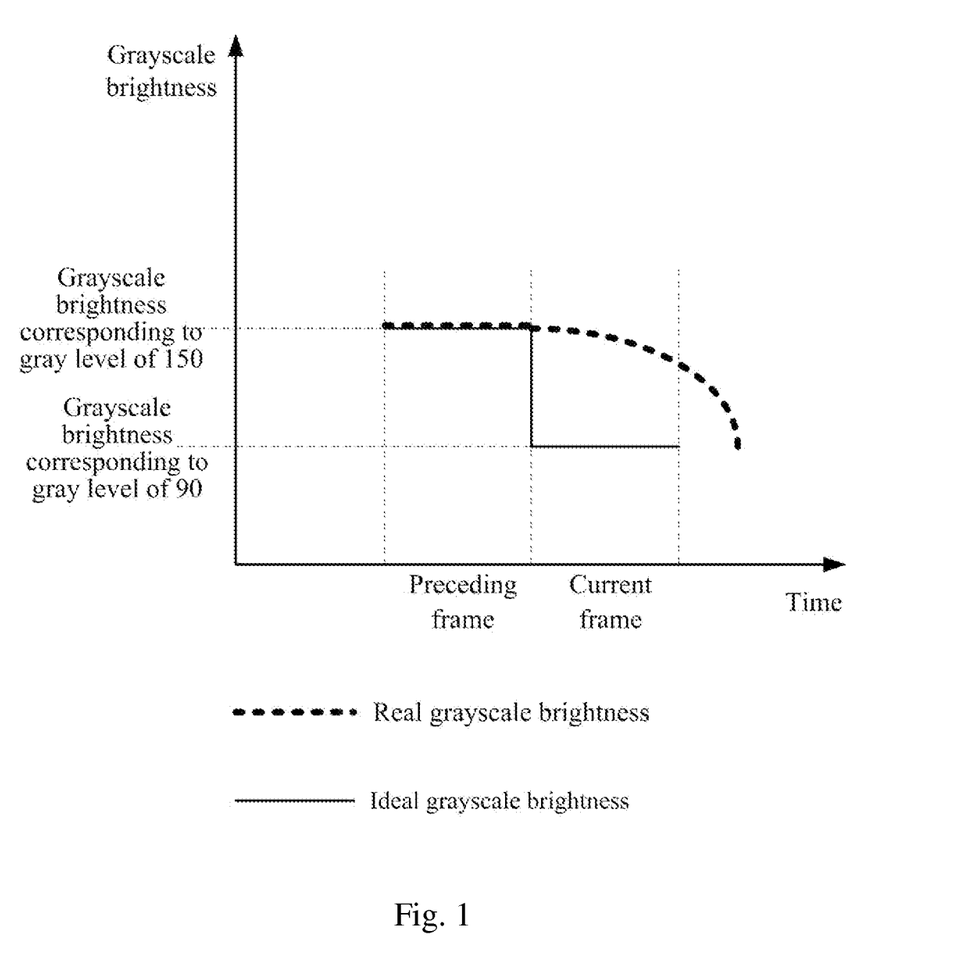
FIG. 1 illustrates a schematic diagram of the problem of the crosstalk due to switching of the grayscale between adjacent frames.

However, when the active shutter 3D display technology used with the liquid crystal displays (LCDs), extreme localized differences between the image to be displayed in one eye and the other may lead to crosstalk, due to LCD panels' pixels sometimes being unable to fully switch, for example, as illustrated in FIG. 1, in the process that a preceding frame (corresponding to the gray level of 150) is being switched to a current frame (corresponding to the gray level of 90), there is a lower liquid crystal response speed and a higher frame rate of the image picture. Thus when the voltage corresponding to the gray level of 150 in the preceding frame is switched rapidly to the voltage corresponding to the gray level of 90 in the current frame, the liquid crystal response speed may not be high enough to lower the real grayscale brightness corresponding to the gray level of 90 in the current frame to ideal grayscale brightness corresponding to the gray level of 90. If the real grayscale brightness corresponding to the gray level of 90 at this time is equivalent to ideal grayscale brightness corresponding to the gray level of 110, then the observer will indeed see the image with crosstalk (i.e., a ghost image, where the image intended for the right eye is saw by the left eye, or the image intended for the left eye is saw by the right eye), and this problem of the crosstalk (ghost image) may degrade seriously the display effect on the 3D display device.

SUMMARY

This section provides a general summary of the disclosure, and is not a comprehensive disclosure of its full scope or all of its features.

Embodiments of the disclosure provide a method and device for adjusting grayscale brightness and a 3D display device so as to address the problem of crosstalk (a ghost image) in the prior art.

One aspect relates to a method for adjusting grayscale brightness, applicable to a 3D display device, the method including:

determining an initial gray level corresponding to a preceding frame, and a target gray level corresponding to a current frame, for any backlight zone corresponding to a zone of a 3D display image;

determining whether the target gray level is comprised in a preset set of gray levels, wherein the preset set of gray levels comprises gray levels no more than a minimum threshold and gray levels no less than an maximum threshold; and the minimum threshold is a lowest gray level at which grayscale brightness of the backlight zone is adjusted through over-voltage driving, and the maximum threshold is a highest gray level at which grayscale brightness of the backlight zone is adjusted through over-voltage driving; and if not, then adjusting the grayscale brightness of the backlight zone through over-voltage driving, otherwise, determining the value of an adjustment parameter corresponding to the initial gray level and the target gray level according to a preset backlight brightness adjustment table, and adjusting backlight brightness of the current frame according to the determined value of the adjustment parameter so that grayscale brightness of the current frame equals grayscale brightness corresponding to the target gray level, wherein the adjustment parameter is a duty cycle of backlight or a reference current of backlight.

Another aspect relates to a device for adjusting grayscale brightness, applicable to a 3D display device, the device including:

one or more processors; and a memory, wherein one or more computer readable program codes are stored in the memory, and the one or more processors are configured to execute the one or more computer readable program codes to perform:

determining an initial gray level corresponding to a preceding frame, and a target gray level corresponding to a current frame, for any backlight zone corresponding to a zone of a 3D display image;

determining whether the target gray level is comprised in a preset set of gray levels, wherein the preset set of gray levels comprises gray levels no more than a minimum threshold and gray levels no less than an maximum threshold; and the minimum threshold is a lowest gray level at which grayscale brightness of the backlight zone is adjusted through over-voltage driving, and the maximum threshold is a highest gray level at which grayscale brightness of the backlight zone is adjusted through over-voltage driving; and if not, then adjusting the grayscale brightness of the backlight zone through over-voltage driving, otherwise, determining the value of an adjustment parameter corresponding to the initial gray level and the target gray level according to a preset backlight brightness adjustment table, and adjusting backlight brightness of the current frame according to the determined value of the adjustment parameter so that grayscale brightness of the current frame equals grayscale brightness corresponding to the target gray level, wherein the adjustment parameter is a duty cycle of backlight or a reference current of backlight.

Yet another aspect relates to a 3D display device including the device for adjusting grayscale brightness.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

In order to make the objects, technical solutions and advantages of the disclosure more apparent, the disclosure will be described below in further details with reference to the drawings, and apparently the embodiments described below are only some but not all of the embodiments of the disclosure. All the other embodiments which can occur to those ordinarily skilled in the art based upon the embodiments here of the disclosure without any inventive effort shall fall into the scope of the disclosure as claimed.

Figure 2:
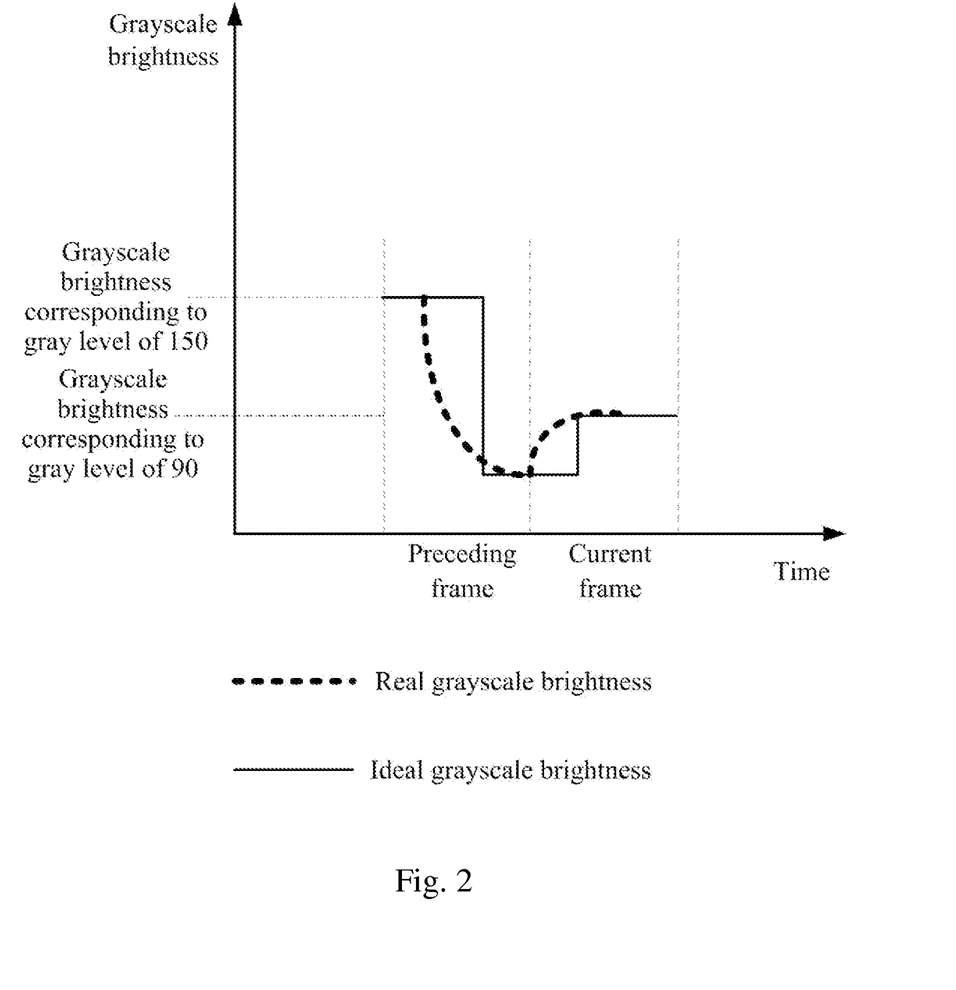
FIG. 2 illustrates a simplified principle diagram of over-voltage driving.

At present, in order to avoid the problem of a poor display effect due to crosstalk, there is provided an over-voltage driving solution, and particularly as illustrated in FIG. 2, before the preceding frame (with the gray level of 150) is switched to the current frame (with the gray level of 90), firstly a higher voltage (e.g., the voltage corresponding to the gray level of 70) than the voltage corresponding to the gray level of 90 is applied to thereby improve the liquid crystal response speed through over-voltage driving so as to reduce crosstalk.

However neither higher nor lower drive voltage can be applied for a too high (more than the gray level of 200) or a too low (less than the gray level of 32) grayscale, so crosstalk may still occur.

To address the above problem, in an embodiment of the disclosure, it is provided a method for adjusting grayscale brightness, applicable to a 3D display device. An initial gray level corresponding to a preceding frame, and a target gray level corresponding to a current frame are determined, for any backlight zone corresponding to a zone of a 3D display image; it is determined whether the target gray level is comprised in a preset set of gray levels, wherein the preset set of gray levels comprises gray levels no more than a minimum threshold and gray levels no less than an maximum threshold; and the minimum threshold is a lowest gray level at which grayscale brightness of the backlight zone is adjusted through over-voltage driving, and the maximum threshold is a highest gray level at which grayscale brightness of the backlight zone is adjusted through over-voltage driving; and if not, then the grayscale brightness of the backlight zone is adjusted through over-voltage driving; otherwise, the value of an adjustment parameter corresponding to the initial gray level and the target gray level is determined according to a preset backlight brightness adjustment table, and backlight brightness of the current frame is adjusted according to the determined value of the adjustment parameter so that grayscale brightness of the current frame equals grayscale brightness corresponding to the target gray level; wherein the adjustment parameter is a duty cycle of backlight or a reference current of backlight.

In the embodiment of the disclosure, an initial gray level and a target gray level are determined, and it is determined whether the target gray level is too low or too high, so that it is determined whether to adjust grayscale brightness through over-voltage driving, and in the case that it is not appropriate to adjust grayscale brightness through over-voltage driving, a backlight brightness adjustment table is searched, and backlight brightness is adjusted (up or down) according to the found value of an adjustment parameter to thereby adjust the grayscale brightness so as to reduce crosstalk in liquid crystal display.

In an embodiment of the disclosure, the value of the adjustment parameter corresponding to the initial gray level and the target gray level is determined according to the preset backlight brightness adjustment table as follows:

If the initial gray level and the target gray level are present in the backlight brightness adjustment table, then the backlight brightness adjustment table is searched for the value of the adjustment parameter corresponding to the initial gray level and the target gray level; and If the initial gray level and the target gray level are not present in the backlight brightness adjustment table, then the value of the adjustment parameter corresponding to the initial gray level and the target gray level is calculated according to the backlight brightness adjustment table using an interpolation algorithm.

In the embodiment of the disclosure, for a backlight zone of which the grayscale brightness cannot be adjusted through over-voltage driving, the preset backlight brightness adjustment table can be searched for the corresponding value of the adjustment parameter, or the corresponding value of the adjustment parameter can be calculated according to the backlight brightness adjustment table using the interpolation algorithm, to thereby improve the flexibility in obtaining the corresponding value of the adjustment parameter.

In an embodiment of the disclosure, when the adjustment parameter is the duty cycle of backlight, the backlight brightness of a current frame is adjusted according to the determined value of the duty cycle of backlight so that the grayscale brightness of the current frame equals grayscale brightness corresponding to the target gray level as follows:

If the target gray level is less than the initial gray level, then the backlight brightness of the current frame is adjusted down according to the found value of the duty cycle of backlight so that the grayscale brightness of the current frame equals the grayscale brightness corresponding to the target gray level; and If the target gray level is more than the initial gray level, then the backlight brightness of the current frame is adjusted up according to the found value of the duty cycle of backlight so that the grayscale brightness of the current frame equals the grayscale brightness corresponding to the target gray level.

In the embodiment of the disclosure, the duty cycle of backlight for the backlight zone is adjusted to thereby adjust the backlight brightness (up or down) of the backlight zone so that the grayscale brightness of the current frame is ideal grayscale brightness (i.e., the grayscale brightness corresponding to the target gray level) so as to reduce crosstalk.

In an embodiment of the disclosure, when the adjustment parameter is the reference current of backlight, the backlight brightness of a current frame is adjusted according to the determined value of the reference current of the backlight so that the grayscale brightness of the current frame equals grayscale brightness corresponding to the target gray level as follows:

If the target gray level is less than the initial gray level, then the backlight brightness of the current frame is adjusted down according to the found value of the reference current of the backlight so that the grayscale brightness of the current frame equals the grayscale brightness corresponding to the target gray level; and If the target gray level is more than the initial gray level, then the backlight brightness of the current frame is adjusted up according to the found value of the reference current of the backlight so that the grayscale brightness of the current frame equals the grayscale brightness corresponding to the target gray level.

In the embodiment of the disclosure, the reference current of backlight for the backlight zone is adjusted to thereby adjust the backlight brightness (up or down) of the backlight zone so that the grayscale brightness of the current frame is ideal grayscale brightness (i.e., the grayscale brightness corresponding to the target gray level) so as to reduce crosstalk.

In an embodiment of the disclosure, the backlight brightness adjustment table is preset as follows:

For any backlight zone, the reference current of backlight for the backlight zone is maintained, and when the initial gray level corresponding to the preceding frame is adjusted to the target gray level corresponding to the current frame, the duty cycle of backlight for the backlight zone is adjusted so that the grayscale brightness of the current frame equals the grayscale brightness corresponding to the target gray level, and the value of the duty cycle of the backlight at the current grayscale brightness is recorded; and here the initial gray level ranges from 0 to 255, and the target gray level ranges throughout gray levels in the preset set of gray levels.

In the embodiment of the disclosure, the backlight brightness adjustment table can be preset as above to thereby improve the accuracy of the adjustment parameter so as to adjust the grayscale brightness to the desirable grayscale brightness in the subsequent process.

In an embodiment of the disclosure, the backlight brightness adjustment table is preset as follows:

For any backlight zone, the duty cycle of backlight for the backlight zone is maintained, and when the initial gray level corresponding to the preceding frame is adjusted to the target gray level corresponding to the current frame, the reference current of the backlight for the backlight zone is adjusted so that the grayscale brightness of the current frame equals the grayscale brightness corresponding to the target gray level, and the value of the reference current of the backlight at the current grayscale brightness is recorded; and here the initial gray level ranges from 0 to 255, and the target gray level ranges throughout gray levels in the preset set of gray levels.

In the embodiment of the disclosure, the backlight brightness adjustment table can be preset as above to thereby improve the accuracy of the adjustment parameter so as to adjust the grayscale brightness to the desirable grayscale brightness in the subsequent process.

The technical solution according to the disclosure will be described below in details with reference to particular embodiments thereof, and the disclosure includes but will not be limited to the following embodiments.

Figure 3:
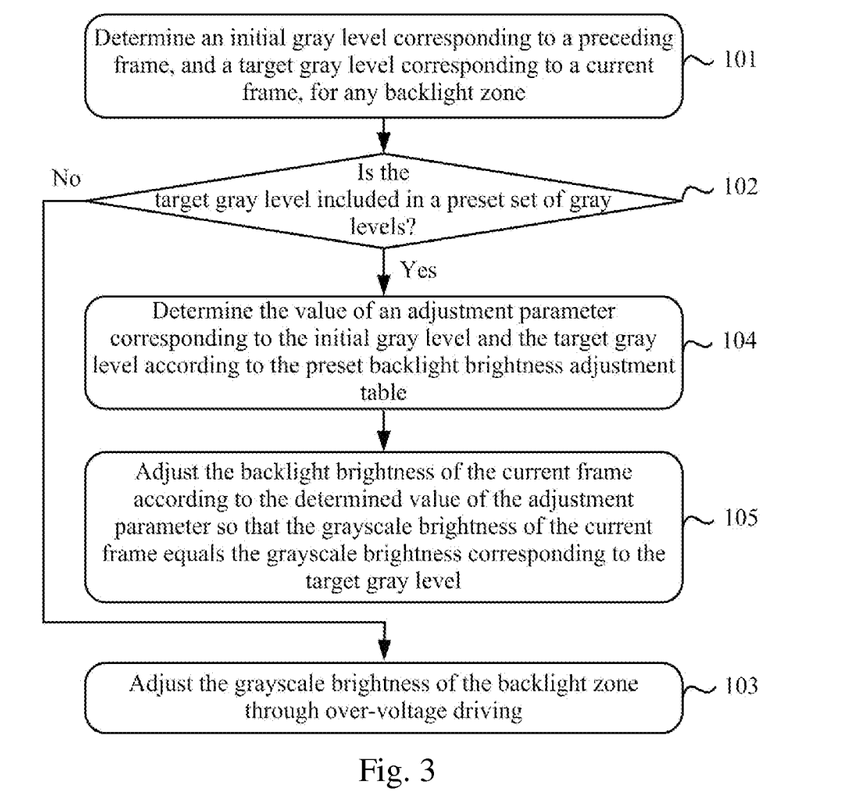
FIG. 3 illustrates a schematic flow chart of a method for adjusting grayscale brightness according to an embodiment of the disclosure.

As illustrated in FIG. 3, it is provided a schematic flow chart of a method for adjusting grayscale brightness according to an embodiment of the disclosure, applicable to a 3D display device, the method including the following operations:

Operation 101: an initial gray level corresponding to a preceding frame, and a target gray level corresponding to a current frame are determined, for any backlight zone corresponding to a zone of a 3D display image.

In this operation 101, the initial gray level and the target gray level can be determined in any particular manner, and the gray levels can be determined through comparison or can be determined otherwise as in the prior art, so a repeated description thereof will be omitted here.

Operation 102: it is determined whether the target gray level is included in a preset set of gray levels. If not, then the flow proceeds to the operation 103; otherwise, the flow proceeds to the operation 104.

In the active shutter 3D display mode, when the initial gray level corresponding to the preceding frame is adjusted to the target gray level corresponding to the current frame, the problem of crosstalk in the image picture due to a lower liquid crystal response speed will occur. As described above, the liquid crystal response speed can be adjusted through over-voltage driving, but for a lower gray level (e.g., a gray level less than 34) or a higher gray level (e.g., a gray level more than 200), the liquid crystal response speed cannot be adjusted through over-voltage driving, and further the problem of crosstalk cannot be addressed.

Thus in the embodiment of the disclosure, a range of gray levels which can be adjusted through over-voltage driving needs to be predetermined experimentally or empirically, and also a range of gray levels which cannot be adjusted through over-voltage driving will be determined. In the embodiment of the disclosure, the range of gray levels which cannot be adjusted through over-voltage driving can be interpreted as a preset set of gray levels including gray levels no more than a minimum threshold and gray levels no less than a maximum threshold; and here the minimum threshold is a lowest gray level at which grayscale brightness can be adjusted through over-voltage driving, and the maximum threshold is a highest gray level at which grayscale brightness can be adjusted through over-voltage driving. In an implementation, the preset set of gray levels is determined by a response speed of liquid crystal molecules, and particularly the preset set of gray levels can be set to $[0,34) \cup (200,255]$.

After the initial gray level corresponding to the preceding frame, and the target gray level corresponding to the current frame, in the current backlight zone are determined, different processes need to be performed for the different target gray levels. Particularly it is determined whether the target gray level is present in the preset set of gray levels, and if so, then it indicates that the grayscale brightness of the current backlight zone cannot be adjusted through over-voltage driving, but the backlight brightness thereof needs to be adjusted to thereby reduce crosstalk; otherwise, then it indicates that the grayscale brightness of the current backlight zone can't be adjusted through over-voltage driving to thereby reduce crosstalk without adjusting the backlight brightness of the backlight zone.

Operation 103: the grayscale brightness of the backlight zone is adjusted through over-voltage driving.

In this operation 103, voltage for the current backlight zone to control the gray level is adjusted through over-voltage driving as in the prior art to thereby improve the liquid crystal response speed, and further when the preceding frame (with a higher gray level) is switched to the current frame (with a lower gray level), the real grayscale brightness of the current frame can be lowered to ideal grayscale brightness corresponding to the lower gray level as rapidly as possible, so such a problem will not occur that the real grayscale brightness cannot be lowered in a timely manner to the ideal grayscale brightness corresponding to the lower gray level due to the lower liquid crystal response speed; and similarly when the preceding frame (with a lower gray level) is switched to the current frame (with a higher gray level), the real grayscale brightness of the current frame can be raised to ideal grayscale brightness corresponding to the higher gray level as rapidly as possible, so such a problem will not occur that the real grayscale brightness cannot be raised in a timely manner to the ideal grayscale brightness corresponding to the higher gray level due to the lower liquid crystal response speed.

If it is determined that the target gray level is included in the preset set of gray levels, then the backlight brightness of the current frame can be adjusted in the below operations 104 and 105.

For the backlight brightness of the current frame, an image is displayed on the existing liquid crystal panel in such a way that for any backlight zone, grayscale brightness corresponding to a real gray level thereof depends upon transmissivity of a liquid crystal panel and backlight brightness of a backlight module as represented in Equation (1) of:

$$B_{gray}=T_r*B_l=(n/255)^{r}*(D*B_{la}) \quad (1)$$

Where $B_{gray}$ represents the grayscale brightness corresponding to the gray level; $T_r$ represents the transmissivity of the liquid crystal panel; $B_l$ represents the backlight brightness of the backlight module; n represents a gray level of the image; r represents a Camma value of the image; D represents a duty cycle of backlight; and $B_{la}$ represents reference current of backlight.

Furthermore the transmissivity of the liquid crystal panel is related to the gray level of the image, and the backlight brightness of the backlight module depends upon the duty cycle of backlight and the reference current of backlight as represented in Equation (2) of:

$$B_l=D*B_{la} \quad (2)$$

In view of the above, for any backlight zone, grayscale brightness corresponding to a gray level thereof can be adjusted as a function of the transmissivity or can be adjusted as a function of backlight brightness. Since the grayscale brightness can be dependent upon the backlight brightness $B_l$, the grayscale brightness can be adjusted by adjusting the backlight brightness to thereby reduce crosstalk. Furthermore the backlight brightness is determined by the duty cycle of backlight and the reference current of backlight, the grayscale brightness can be adjusted by adjusting the duty cycle of backlight or the reference current of backlight to thereby reduce crosstalk in liquid crystal display Operation 104: the value of an adjustment parameter corresponding to the initial gray level and the target gray level is determined from the preset backlight brightness adjustment table.

In the embodiment of the disclosure, the adjustment parameter can be a duty cycle of backlight or a reference current of backlight.

Particularly if the initial gray level and the target gray level are present in the backlight brightness adjustment table, then the backlight brightness adjustment table is searched for the value of the adjustment parameter corresponding to the initial gray level and the target gray level; and If the initial gray level and the target gray level are not present in the backlight brightness adjustment table, then the value of the adjustment parameter corresponding to the initial gray level and the target gray level is calculated from the backlight brightness adjustment table using an interpolation algorithm.

It shall be appreciated that since there are numerous combinations of the initial gray level (0 to 255) and the target gray level (all of gray levels in the preset set of gray levels), and it is highly complex and difficult to determine the backlight brightness adjustment table as referred to in the disclosure empirically or otherwise statically, so not all the values of the adjustment parameter corresponding to the respective combinations of the initial gray level and the target gray level are recorded in the backlight brightness adjustment table, for example, they can be arranged as an array of equally spaced values and/or unequally spaced values. Then the values of the adjustment parameter corresponding to the combinations of the initial gray level and the target gray level, which are not recorded can be determined by an interpolation algorithm, or an intermediate-value algorithm, according to the combinations of the initial gray level and the target gray level, recorded in the backlight brightness adjustment table, adjacent to the combinations of the initial gray level and the target gray level to be calculated, and the corresponding values of the adjustment parameter.

Here when the adjustment parameter is the duty cycle of backlight, the backlight brightness adjustment table can be preset as follows:

For any backlight zone, the reference current of backlight for the backlight zone is maintained, and when the initial gray level corresponding to the preceding frame is adjusted to the target gray level corresponding to the current frame, the duty cycle of backlight for the backlight zone is adjusted so that the grayscale brightness of the current frame equals the grayscale brightness corresponding to the target gray level, and the value of the duty cycle of backlight at the current grayscale brightness is recorded; and here the initial gray level ranges from 0 to 255, and the target gray level ranges throughout gray levels in the preset set of gray levels.

When the adjustment parameter is the reference current of backlight, the backlight brightness adjustment table is preset as follows:

For any backlight zone, the duty cycle of backlight for the backlight zone is maintained, and when the initial gray level corresponding to the preceding frame is adjusted to the target gray level corresponding to the current frame, the reference current of backlight for the backlight zone is adjusted so that the grayscale brightness of the current frame equals the grayscale brightness corresponding to the target gray level, and the value of the reference current of backlight at the current grayscale brightness is recorded; and here the initial gray level ranges from 0 to 255, and the target gray level ranges throughout gray levels in the preset set of gray levels.

Operation 105: the backlight brightness of the current frame is adjusted according to the found value of the adjustment parameter so that the grayscale brightness of the current frame equals the grayscale brightness corresponding to the target gray level.

In one aspect, when the adjustment parameter is the duty cycle of backlight, the backlight brightness of the current frame is adjusted according to the determined value of the duty cycle of backlight so that the grayscale brightness of the current frame equals the grayscale brightness corresponding to the target gray level as follows:

If the target gray level is less than the initial gray level, then the backlight brightness of the current frame is adjusted down according to the determined value of the duty cycle of backlight so that the grayscale brightness of the current frame equals the grayscale brightness corresponding to the target gray level; and If the target gray level is more than the initial gray level, then the backlight brightness of the current frame is adjusted up according to the determined value of the duty cycle of backlight so that the grayscale brightness of the current frame equals the grayscale brightness corresponding to the target gray level.

In another aspect, when the adjustment parameter is the reference current of backlight, the backlight brightness of the current frame is adjusted according to the determined value of the reference current of backlight so that the grayscale brightness of the current frame equals the grayscale brightness corresponding to the target gray level as follows:

If the target gray level is less than the initial gray level, then the backlight brightness of the current frame is adjusted down according to the determined value of the reference current of backlight so that the grayscale brightness of the current frame equals the grayscale brightness corresponding to the target gray level; and If the target gray level is more than the initial gray level, then the backlight brightness of the current frame is adjusted up according to the determined value of the reference current of backlight so that the grayscale brightness of the current frame equals the grayscale brightness corresponding to the target gray level.

In the embodiment of the disclosure, the initial gray level and the target gray level are determined, and it is determined whether the target gray level is too low or too high so that it is determined whether over-voltage driving can be applicable, and in the case that it is not appropriate to adjust the grayscale brightness through over-voltage driving, the backlight brightness adjustment table is searched, and the backlight brightness is adjusted (up or down) using the found value of the adjustment parameter to thereby adjust the grayscale brightness so as to reduce crosstalk in liquid crystal display.

In order to understand the solution above, the adjustment solution above will be described briefly below in two particular embodiments of the disclosure.

As depicted in Table 1, the initial gray level of the preceding frame and the target gray level of the current frame for any backlight zone are determined as 8 and 0 respectively. Since the target gray level is the lowest gray level, the grayscale brightness cannot be adjusted through over-voltage driving. At this time the backlight brightness can be adjusted from the predetermined Table 1, and particularly Table 1 is determined with the adjustment parameter being a duty cycle of backlight and is searched for the duty cycle of backlight of 18% corresponding to the gray levels 8 and 0, so the duty cycle of backlight for the backlight zone needs to be adjusted down by 18% to thereby adjust down the grayscale brightness so that the grayscale brightness of the current frame is the closest to the ideal grayscale brightness corresponding to the target gray level of 0 at this time for the purpose of reducing crosstalk. Alike when the initial gray level is 60 and the target gray level is 250, the duty cycle of backlight for the backlight zone needs to be adjusted up to thereby adjust up the grayscale brightness so that the grayscale brightness of the current frame is the closest to the ideal grayscale brightness corresponding to the target gray level of 250 at this time for the purpose of reducing crosstalk.

Moreover if the initial gray level of the preceding frame and the target gray level of the current frame of the backlight zone are 10 and 12 respectively, then only the duty cycle of backlight of 20% corresponding to the initial gray level of 8 and the target gray level of 8, the duty cycle of backlight of 21% corresponding to the initial gray level of 8 and the target gray level of 16, the duty cycle of backlight of 18% corresponding to the initial gray level of 16 and the target gray level of 8, and the duty cycle of backlight of 20% corresponding to the initial gray level of 16 and the target gray level of 16 can be found in the table; and at this time an interpolation algorithm can be applied for calculation. Firstly the duty cycle of backlight of (12−8)/(16−8)*(21%−20%)+20%=20.5% corresponding to the initial gray level of 8 and the target gray level of 12 is calculated linearly from the duty cycle of backlight of 20% corresponding to the initial gray level of 8 and the target gray level of 8, the duty cycle of backlight of 21% corresponding to the initial gray level of 8 and the target gray level of 16. Then the duty cycle of backlight of 19% corresponding to the initial gray level of 16 and the target gray level of 12 is calculated linearly from the duty cycle of backlight of 18% corresponding to the initial gray level of 16 and the target gray level of 8, and the duty cycle of backlight of 20% corresponding to the initial gray level of 16 and the target gray level of 16. Finally the duty cycle of backlight corresponding to the initial gray level of 10 and the target gray level of 12 is calculated as a result of linear interpolation: (10−8)/(16−8)*(19%−20.5%)+20.5%=20.13%.

TABLE 1

| | | Target gray level [0, 34)∪(200, 255] | | | | | | | | | |
|---|---|---|---|---|---|---|---|---|---|---|---|
| | | 0 | 8 | 16 | ... | ... | ... | ... | 239 | 247 | 255 |
| Initial gray | 0 | 20% | 21% | ... | ... | ... | ... | ... | ... | ... | ... |
| | 8 | 18% | 20% | 21% | ... | ... | ... | ... | ... | ... | ... |

TABLE 1-continued

| | | Target gray level [0, 34)∪(200, 255] | | | | | | | | | |
|---|---|---|---|---|---|---|---|---|---|---|---|
| | | 0 | 8 | 16 | ... | ... | ... | ... | 239 | 247 | 255 |
| level [0, 255] | 16 | ... | 18% | 20% | 21% | ... | ... | ... | ... | ... | ... |
| | ... | ... | ... | 18% | 20% | 21% | ... | ... | ... | ... | ... |
| | ... | ... | ... | ... | 18% | 20% | 21% | ... | ... | ... | ... |
| | n | ... | ... | ... | ... | 18% | 20% | 21% | ... | ... | ... |
| | ... | ... | ... | ... | ... | ... | 18% | 20% | 21% | ... | ... |
| | 239 | ... | ... | ... | ... | ... | ... | 18% | 20% | 21% | ... |
| | 247 | ... | ... | ... | ... | ... | ... | ... | 18% | 20% | 21% |
| | 255 | ... | ... | ... | ... | ... | ... | ... | ... | 18% | 20% |

As depicted in Table 2, the initial gray level of the preceding frame and the target gray level of the current frame for any backlight zone are determined as 8 and 0 respectively. Since the target gray level is the lowest gray level, the grayscale brightness cannot be adjusted through over-voltage driving. At this time the backlight brightness can be adjusted from the predetermined Table 2, and particularly Table 2 is determined with the adjustment parameter being reference current of backlight which is 300 mA when no adjustment is made. Table 2 is searched for the reference current of backlight of 295 mA corresponding to the gray levels 8 and 0, so the reference current of backlight for the backlight zone needs to be adjusted to 295 mA to thereby adjust down the grayscale brightness so that the grayscale brightness of the current frame is the closest to the ideal grayscale brightness corresponding to the target gray level of 0 at this time for the purpose of reducing crosstalk Alike when the initial gray level is 60 and the target gray level is 250, the reference current of backlight for the backlight zone needs to be adjusted up to thereby adjust up the grayscale brightness so that the grayscale brightness of the current frame is the closest to the ideal grayscale brightness corresponding to the target gray level of 250 at this time for the purpose of reducing crosstalk.

When the adjustment parameter is the reference current of backlight, if the determined initial gray level and target gray level are not present in the backlight brightness adjustment table, then the interpolation algorithm can be applied for calculation referring to the previous example. The disclosure will not be limited in this regard.

Figure 4:
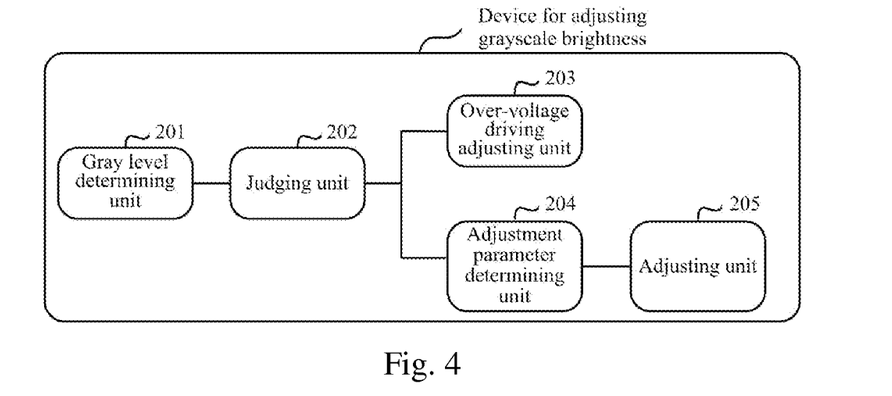
FIG. 4 illustrates a schematic structural diagram of a device for adjusting grayscale brightness according to an embodiment of the disclosure.

Based upon the same inventive idea, an embodiment of the disclosure further provides a device for adjusting grayscale brightness as illustrated in FIG. 4. Since the device corresponds to the method for adjusting grayscale brightness according to the embodiment of the disclosure, reference can be made to the implementation of the method for an implementation of this embodiment of the disclosure, so a repeated description thereof will be omitted here. The device for adjusting grayscale brightness according to the embodiment of the disclosure can be integrated in a liquid crystal device or can be attached to the liquid crystal device.

As illustrated in FIG. 4, a device for adjusting grayscale brightness according to an embodiment of the disclosure includes:

One or more processors; and

A memory,

Where one or more computer readable program codes are stored in the memory, and the one or more processors are configured to execute the one or more computer readable program codes to perform functions of the following units:

A gray level determining unit 201 is configured to determine an initial gray level corresponding to a preceding frame, and a target gray level corresponding to a current frame, for any backlight zone.

A judging unit 202 is configured to determine whether the target gray level is included in a preset set of gray levels.

The preset set of gray levels includes gray levels no more than a minimum threshold and gray levels no less than an maximum threshold, where the minimum threshold is a lowest gray level at which grayscale brightness of the backlight zone is adjusted through over-voltage driving, and the maximum threshold is a highest gray level at which grayscale brightness of the backlight zone is adjusted through over-voltage driving.

An over-voltage driving adjusting unit 203 is configured to adjust the grayscale brightness of the backlight zone through over-voltage driving when the judging unit 202 determines that the target gray level is not present in the preset set of gray levels.

An adjustment parameter determining unit 204 is configured to determine the value of an adjustment parameter corresponding to the initial gray level and the target gray level according to a preset backlight brightness adjustment

TABLE 2

| | | Target gray level [0, 34)∪(200, 255] | | | | | | | | | |
|---|---|---|---|---|---|---|---|---|---|---|---|
| | | 0 | 8 | 16 | ... | ... | ... | ... | 239 | 247 | 255 |
| Initial gray level [0, 255] | 0 | 300 mA | 305 mA | ... | ... | ... | ... | ... | ... | ... | 330 mA |
| | 8 | 295 mA | 300 mA | 305 mA | ... | ... | ... | ... | ... | ... | ... |
| | 16 | ... | 295 mA | 300 mA | 305 mA | ... | ... | ... | ... | ... | ... |
| | ... | ... | ... | 295 mA | 300 mA | 305 mA | ... | ... | ... | ... | ... |
| | ... | ... | ... | ... | 295 mA | 300 mA | 305 mA | ... | ... | ... | ... |
| | n | ... | ... | ... | ... | 295 mA | 300 mA | 305 mA | ... | ... | ... |
| | ... | ... | ... | ... | ... | ... | 295 mA | 300 mA | 305 mA | ... | ... |
| | 239 | ... | ... | ... | ... | ... | ... | 295 mA | 300 mA | 305 mA | ... |
| | 247 | ... | ... | ... | ... | ... | ... | ... | 295 mA | 300 mA | 305 mA |
| | 255 | 280 mA | ... | ... | ... | ... | ... | ... | ... | 295 mA | 300 mA | table when the judging unit 202 determines that the target gray level is present in the preset set of gray levels.

An adjusting unit 205 is configured to adjust backlight brightness of the current frame according to the value of the adjustment parameter determined by the adjustment parameter determining unit 204 so that grayscale brightness of the current frame equals grayscale brightness corresponding to the target gray level.

In an embodiment of the disclosure, the adjustment parameter determining unit 204 is configured to search the backlight brightness adjustment table for the value of the adjustment parameter corresponding to the initial gray level and the target gray level when the initial gray level and the target gray level are present in the backlight brightness adjustment table; and To calculate the value of the adjustment parameter corresponding to the initial gray level and the target gray level from the backlight brightness adjustment table using an interpolation algorithm when the initial gray level and the target gray level are not present in the backlight brightness adjustment table.

In an embodiment of the disclosure, when the adjustment parameter is the duty cycle of backlight, the adjusting unit 205 is configured:

If the target gray level is less than the initial gray level, to adjust down the backlight brightness of the current frame according to the determined value of the duty cycle of backlight so that the grayscale brightness of the current frame equals the grayscale brightness corresponding to the target gray level; and If the target gray level is more than the initial gray level, to adjust up the backlight brightness of the current frame according to the determined value of the duty cycle of backlight so that the grayscale brightness of the current frame equals the grayscale brightness corresponding to the target gray level.

In the embodiment of the disclosure, the backlight brightness adjustment table is preset as follows: for any backlight zone, the reference current of backlight for the backlight zone is maintained, and when the initial gray level corresponding to the preceding frame is adjusted to the target gray level corresponding to the current frame, the duty cycle of backlight for the backlight zone is adjusted so that the grayscale brightness of the current frame equals the grayscale brightness corresponding to the target gray level, and the value of the duty cycle of backlight at the current grayscale brightness is recorded; where the initial gray level ranges from 0 to 255, and the target gray level ranges throughout gray levels in the preset set of gray levels.

In an embodiment of the disclosure, when the adjustment parameter is the reference current of backlight, the adjusting unit 205 is configured:

If the target gray level is less than the initial gray level, to adjust down the backlight brightness of the current frame according to the determined value of the reference current of backlight so that the grayscale brightness of the current frame equals the grayscale brightness corresponding to the target gray level; and If the target gray level is more than the initial gray level, to adjust up the backlight brightness of the current frame according to the determined value of the reference current of backlight so that the grayscale brightness of the current frame equals the grayscale brightness corresponding to the target gray level.

In the embodiment of the disclosure, the backlight brightness adjustment table is preset as follows: for any backlight zone, the duty cycle of backlight for the backlight zone is maintained, and when the initial gray level corresponding to the preceding frame is adjusted to the target gray level corresponding to the current frame, the reference current of backlight for the backlight zone is adjusted so that the grayscale brightness of the current frame equals the grayscale brightness corresponding to the target gray level, and the value of the reference current of backlight at the current grayscale brightness is recorded; where the initial gray level ranges from 0 to 255, and the target gray level ranges throughout gray levels in the preset set of gray levels.

Here the memory in the device for adjusting grayscale brightness can be configured to store software programs and modules, and the processor can run the software programs and the modules stored in the memory to perform respective functional applications and data processing. The memory can include a high-speed random access memory and can also include a nonvolatile memory, e.g., at least one magnetic disk memory, flash memory or another volatile solid-state memory. Moreover the memory can also include a memory controller to provide the processor and an input unit with an access to the memory; and The processor in the device for adjusting grayscale brightness is a control center of the device, and connects the respective components throughout the device for adjusting grayscale brightness through various interfaces and lines, so that the processor runs or executes the software programs and/or the modules stored in the memory and invokes the data stored in the memory to perform the respective functions of the device for adjusting grayscale brightness and to process the data so as to supervise the device for adjusting grayscale brightness as a whole. Alternatively the processor can include one or more processing cores; and alternatively the processor can be integrated with an application processor and a modem processor, where the application processor generally handles an operating system, user interfaces, applications, etc., and the modem processor generally handles wireless communication. As can be appreciated, the modem processor above may not be integrated into the processor.

Figure 5:
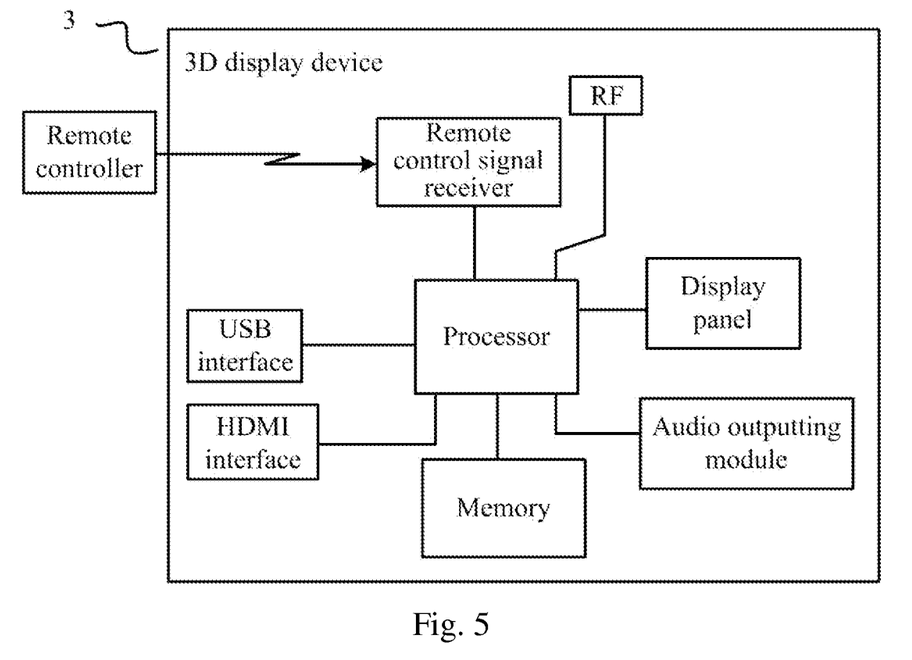
FIG. 5 illustrates a schematic structural diagram of a 3D display device according to an embodiment of the disclosure.

Moreover as illustrated in FIG. 5, an embodiment of the disclosure further provides a 3D display device 3 including the device for adjusting grayscale brightness. Also the 3D display device 3 can include a memory, an input unit, an output unit, one or more processors, and other components. Those skilled in the art can appreciate that the 3D display device 3 will not be limited to the structure as illustrated in FIG. 5 but can include more or less components than those as illustrated or some components which are combined or some components which are arranged otherwise, where:

The memory can be configured to store software programs and modules, and the processor can run the software programs and the modules stored in the memory to perform respective functional applications and data processing. The memory can include a high-speed random access memory and can also include a nonvolatile memory, e.g., at least one magnetic disk memory, flash memory or another volatile solid-state memory. Moreover the memory can also include a memory controller to provide the processor and an input unit with an access to the memory; and The processor is a control center of the 3D display device, and connects the respective components throughout the 3D display device through various interfaces and lines, so that the processor runs or executes the software programs and/or the modules stored in the memory and invokes the data stored in the memory to perform the respective functions of the 3D display device and to process the data so as to supervise the 3D display device as a whole. Alternatively the processor can include one or more processing cores; and alternatively the processor can be integrated with an application processor and a modem processor, where the application processor generally handles an operating system, user interfaces, applications, etc., and the modem processor generally handles wireless communication. As can be appreciated, the modem processor above may not be integrated into the processor.

The 3D display device 3 can further include a TV and radio receiver, a high-definition multimedia interface, a USB interface, an audio and video input component and other input units, and the input unit can further include a remote control receiver to receive a signal transmitted by a remote controller. Moreover the input unit can further include a touch sensitive surface and another input device, where the touch sensitive surface can be embodied in various types of resistive, capacitive, infrared, surface sound wave and other types, and the other input device can include but will not be limited to one or more of a physical keyboard, functional keys (e.g., volume control press keys, a power-on or power-off press key, etc.), a track ball, a mouse, a joystick, etc.

The output unit is configured to output an audio signal, a video signal, an alarm signal, a vibration signal, etc., The output unit can include a display panel, a sound output module, etc., The display panel can be configured to display information input by a user or information provided to the user, and various graphic user interfaces of the 3D display device 3, where these graphic user interfaces can be composed of graphics, texts, icons, videos and any combination thereof. For example the display panel can be embodied as a Liquid Crystal Display (LCD), an Organic Light-Emitting Diode (OLED) display, a flexible display, a 3D display, a Cathode Ray Tube (CRT), a plasma display panel, etc.

The 3D display device 3 can further include at least one sensor (not illustrated), e.g., an optical sensor, a motion sensor and other sensors. Particularly the optical sensor can include an ambient light sensor and a proximity sensor, where the ambient light sensor can adjust the brightness of the display panel according to the luminosity of ambient light rays, and the proximity sensor can power off the display panel and/or backlight when the 3D display device 3 moves to certain location. The 3D display device 3 can be further configured with a gyroscope, a barometer, a hygrometer, a thermometer, an infrared sensor and other sensors.

The 3D display device 3 can further include an audio circuit (not illustrated), a speaker and a microphone in which can provide an audio interface between the user and the 3D display device 3. The audio circuit can convert received audio data into an electric signal and transmit the electric signal to the speaker, which is converted by the speaker into an audio signal for output; and on the other hand, the microphone converts a collected audio signal into an electric signal which is received by the audio circuit and then converted into audio data, and the audio data is further output to the processor for processing and then transmitted to another display device, for example, or the audio data is output to the memory for further processing. The audio circuit may further include an earphone jack for communication between a peripheral earphone and the 3D display device 3.

The 3D display device 3 can further include a Radio Frequency (RF) circuit. The RF circuit can be configured to receive and transmit a signal. Typically the RF circuit includes but will not be limited to an antenna, at least one amplifier, a tuner, one or more oscillators, a Subscriber Identifier Module (SIM) card, a transceiver, a coupler, a Low Noise Amplifier (LNA), a duplexer, etc. The 3D display device 3 can further include a web camera, a Bluetooth module, etc.

Moreover the 3D display device 3 can further include a Wireless Fidelity (WiFi) module (not illustrated). The WiFi technology falls into the category of short-range wireless transmission technologies, and the 3D display device 3 can assist the user in receiving and transmitting an e-mail, browsing a webpage, accessing streaming media, etc., through the WiFi module by which the user is provided with a wireless access to the broadband Internet. Although the WiFi module is illustrated in FIG. 5, it can be appreciated that it may not be necessarily required for the 3D display device 3 but can be omitted as desired without departing from the scope of the disclosure.

Those skilled in the art shall appreciate that the embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for adjusting grayscale brightness, applicable to a 3D display device, the method comprising:
    determining an initial gray level corresponding to a preceding frame, and a target gray level corresponding to a current frame, for a backlight zone corresponding to a zone of a display image;
    determining whether the target gray level is less than a first threshold gray level or greater than a second threshold gray level, wherein the first threshold gray level is less than the second threshold gray level; and
    if not, then in response to determining the target gray level is not less than the first threshold gray level and not greater than the second threshold gray level, adjusting the grayscale brightness of the backlight zone through over-voltage driving,
    in response to determining the target gray level is less than the first threshold gray level or greater than the second threshold gray level, determining a value of an adjustment parameter corresponding to the initial gray level and the target gray level according to a preset backlight brightness adjustment table, and adjusting backlight brightness of the current frame according to the determined value of the adjustment parameter so that grayscale brightness of the current frame substantially equals grayscale brightness corresponding to the target gray level,
    wherein the adjustment parameter is a duty cycle of backlight or a reference current of backlight.

2. The method according to claim 1, wherein determining the value of the adjustment parameter corresponding to the initial gray level and the target gray level according to the preset backlight brightness adjustment table comprises:
    searching the preset backlight brightness adjustment table for the value of the adjustment parameter corresponding to the initial gray level and the target gray level when the initial gray level and the target gray level are present in the backlight brightness adjustment table; and
    calculating the value of the adjustment parameter corresponding to the initial gray level and the target gray level according to the backlight brightness adjustment table using an interpolation algorithm when the initial gray level and the target gray level are not present in the backlight brightness adjustment table.

3. The method according to claim 2, wherein when the adjustment parameter is the duty cycle of backlight, adjusting the backlight brightness of the current frame according to the determined value of the duty cycle of backlight so that the grayscale brightness of the current frame substantially equals the grayscale brightness corresponding to the target gray level comprises:
    if the target gray level is less than the initial gray level, then adjusting down the backlight brightness of the current frame according to the determined value of the duty cycle of backlight so that the grayscale brightness of the current frame substantially equals the grayscale brightness corresponding to the target gray level; and
    if the target gray level is more than the initial gray level, then adjusting up the backlight brightness of the current frame according to the determined value of the duty cycle of backlight so that the grayscale brightness of the current frame substantially equals the grayscale brightness corresponding to the target gray level.

4. The method according to claim 2, wherein when the adjustment parameter is the reference current of backlight, adjusting the backlight brightness of the current frame according to the determined value of the reference current of backlight so that the grayscale brightness of the current frame substantially equals the grayscale brightness corresponding to the target gray level comprises:
    if the target gray level is less than the initial gray level, then adjusting down the backlight brightness of the current frame according to the determined value of the reference current of backlight so that the grayscale brightness of the current frame substantially equals the grayscale brightness corresponding to the target gray level; and
    if the target gray level is more than the initial gray level, then adjusting up the backlight brightness of the current frame according to the determined value of the reference current of backlight so that the grayscale brightness of the current frame substantially equals the grayscale brightness corresponding to the target gray level.

5. The method according to claim 1, wherein the backlight brightness adjustment table is preset as follows:
    for the backlight zone, the reference current of backlight for the backlight zone is maintained, and when the initial gray level corresponding to the preceding frame is adjusted to the target gray level corresponding to the current frame, the duty cycle of backlight for the backlight zone is adjusted so that the grayscale brightness of the current frame equals the grayscale brightness corresponding to the target gray level, and a value of the duty cycle of backlight at the grayscale brightness is recorded; and wherein the initial gray level ranges from 0 to 255, and the target gray level ranges throughout gray levels which are less than the first threshold gray level and gray levels which are greater than the second threshold gray level in the preset set of gray levels.

6. The method according to claim 1, wherein the backlight brightness adjustment table is preset as follows:
    for the backlight zone, the duty cycle of backlight for the backlight zone is maintained, and when the initial gray level corresponding to the preceding frame is adjusted to the target gray level corresponding to the current frame, the reference current of backlight for the backlight zone is adjusted so that the grayscale brightness of the current frame equals the grayscale brightness corresponding to the target gray level, and the value of the reference current of backlight at the grayscale brightness is recorded; and wherein the initial gray level ranges from 0 to 255, and the target gray level ranges throughout gray levels which are less than the first threshold gray level and gray levels which are greater than the second threshold gray level.

7. A 3D display device, comprising a device for adjusting grayscale brightness, wherein the device for adjusting grayscale brightness comprising:
    one or more processors; and
    a non-transitory memory,
    wherein one or more computer readable program codes are stored in the non-transitory memory, and the one or more processors are configured to execute the one or more computer readable program codes to:
    determine an initial gray level corresponding to a preceding frame, and a target gray level corresponding to a current frame, for a backlight zone corresponding to a zone of a display image;

determine whether the target gray level is less than a first threshold gray level or greater than a second threshold gray level, wherein the first threshold gray level is less than the second threshold gray level; and in response to determining the target gray level is not less than the first threshold gray level and not greater than the second threshold gray level, adjust the grayscale brightness of the backlight zone through over-voltage driving, in response to determining the target gray level is less than the first threshold gray level or greater than the second threshold gray level, determine a value of an adjustment parameter corresponding to the initial gray level and the target gray level according to a preset backlight brightness adjustment table, and adjust backlight brightness of the current frame according to the determined value of the adjustment parameter so that grayscale brightness of the current frame substantially equals grayscale brightness corresponding to the target gray level, wherein the adjustment parameter is a duty cycle of backlight or a reference current of backlight.

8. The 3D display device according to claim 7, wherein the one or more processors are further configured to execute the one or more computer readable program codes to:

search the backlight brightness adjustment table for the value of the adjustment parameter corresponding to the initial gray level and the target gray level when the initial gray level and the target gray level are present in the backlight brightness adjustment table; and calculate the value of the adjustment parameter corresponding to the initial gray level and the target gray level according to the backlight brightness adjustment table using an interpolation algorithm when the initial gray level and the target gray level are not present in the backlight brightness adjustment table.

9. The 3D display device according to claim 8, wherein the one or more processors are further configured to execute the one or more computer readable program codes to:

if the target gray level is less than the initial gray level, adjust down the backlight brightness of the current frame according to the determined value of the duty cycle of backlight so that the grayscale brightness of the current frame equals the grayscale brightness corresponding to the target gray level; and if the target gray level is more than the initial gray level, adjust up the backlight brightness of the current frame according to the determined value of the duty cycle of backlight so that the grayscale brightness of the current frame substantially equals the grayscale brightness corresponding to the target gray level.

10. The 3D display device according to claim 8, wherein the one or more processors are further configured to execute the one or more computer readable program codes to:

if the target gray level is less than the initial gray level, adjust down the backlight brightness of the current frame according to the determined value of the reference current of backlight so that the grayscale brightness of the current frame equals the grayscale brightness corresponding to the target gray level; and if the target gray level is more than the initial gray level, adjust up the backlight brightness of the current frame according to the determined value of the reference current of backlight so that the grayscale brightness of the current frame substantially equals the grayscale brightness corresponding to the target gray level.

11. The device according to claim 7, wherein the backlight brightness adjustment table is preset as follows:

for the backlight zone, the reference current of backlight for the backlight zone is maintained, and when the initial gray level corresponding to the preceding frame is adjusted to the target gray level corresponding to the current frame, the duty cycle of backlight for the backlight zone is adjusted so that the grayscale brightness of the current frame equals the grayscale brightness corresponding to the target gray level, and a value of the duty cycle of backlight at the grayscale brightness is recorded; and wherein the initial gray level ranges from 0 to 255, and the target gray level ranges throughout gray levels which are less than the first threshold gray level and gray levels which are greater than the second threshold gray level.

12. The device according to claim 7, wherein the backlight brightness adjustment table is preset as follows:

for the backlight zone, the duty cycle of backlight for the backlight zone is maintained, and when the initial gray level corresponding to the preceding frame is adjusted to the target gray level corresponding to the current frame, the reference current of backlight for the backlight zone is adjusted so that the grayscale brightness of the current frame equals the grayscale brightness corresponding to the target gray level, and the value of the reference current of backlight at the grayscale brightness is recorded; and wherein the initial gray level ranges from 0 to 255, and the target gray level ranges throughout gray levels which are less than the first threshold gray level and gray levels which are greater than the second threshold gray level.

13. A display device, comprising a device for adjusting grayscale brightness, wherein the device for adjusting grayscale brightness comprising:

one or more processors; and a non-transitory memory, wherein one or more computer readable program codes are stored in the non-transitory memory, and the one or more processors are configured to execute the one or more computer readable program codes to:

determine an initial gray level corresponding to a preceding frame, and a target gray level corresponding to a current frame, for a backlight zone corresponding to a zone of a display image;

adjust the grayscale brightness of the backlight zone through over-voltage driving, when the target gray level is not less than a first threshold gray level and not greater than a second threshold gray level; and determine a value of an adjustment parameter corresponding to the initial gray level and the target gray level according to a preset backlight brightness adjustment table, and adjust backlight brightness of the current frame according to the determined value of the adjustment parameter, when the target gray level is less than the first threshold gray level or greater than the second threshold gray level.

\* \* \* \* \*